United States Patent [19]

Jenkins

[11] 3,809,329

[45] May 7, 1974

[54] TAPE TRANSPORT WITH AUTOMATIC TORQUE MOTOR BRAKE

[75] Inventor: John P. Jenkins, Towanda, Ill.

[73] Assignee: International Tapetronics Corporation, Bloomington, Ill.

[22] Filed: Mar. 15, 1973

[21] Appl. No.: 341,769

[52] U.S. Cl. ..................... 242/204, 242/186, 318/7

[51] Int. Cl. ..................... B11b 15/32, G03b 1/04

[58] Field of Search ........... 242/204, 674, 186–191; 318/6, 7, 56, 57, 63, 227, 137; 179/100.2 R; 274/4 D, 11 D

[56] References Cited

UNITED STATES PATENTS

| | | | |
|---|---|---|---|
| 2,535,486 | 12/1950 | Dank | 242/204 X |
| 2,656,129 | 10/1953 | De Turk et al. | 242/75.51 |
| 2,974,891 | 3/1961 | Waldhauer | 242/204 |
| 3,365,551 | 1/1968 | Atsumi | 179/100.2 R |

*Primary Examiner*—Leonard D. Christian
*Attorney, Agent, or Firm*—Davis, McCaleb & Lucas

[57] ABSTRACT

A tape transport having opposite ends of a recording tape wound upon reels driven by forward and rewind torque motors. Switch means for each motor is actuatable between first and second positions. In the first position the corresponding motor is connected to an alternating current power source to drive the motor in a tape winding direction, and a capacitor is connected in series with a rectifier and is charged by the alternating current power source. Subsequent actuation of the switch means to the second position deenergizes the winding motor and simultaneously discharges the capacitor through the unwinding motor to apply a braking load and thereby prevent looping and overrunning of the tape.

5 Claims, 3 Drawing Figures

TAPE TRANSPORT WITH AUTOMATIC TORQUE MOTOR BRAKE

CROSS REFERENCES TO RELATED APPLICATIONS

Reference is made to the following copending, related patent applications, assigned to the same assignee:

Jenkins application Ser. No. 237,707 Filed Mar. 24, 1972 on COMPACT CASSETTE TAPE TRANSPORT WITH DIRECT CAPSTAN AND TORQUE MOTOR DRIVES Jenkins application Ser. No. 237,762 Filed Mar. 24, 1972 on CASSETTE TAPE TRANSPORT WITH PIVOTALLY SUPPORTED UNIVERSALLY ADJUSTABLE HEAD AND UPRIGHT FRONT MOUNTED CASSETTE

BACKGROUND OF THE INVENTION

This invention relates to tape playback apparatus in which the ends of a recording tape are wound on reels driven by forward and rewind torque motors. It relates particularly to a tape transport for use in the broadcasting industry where tape must be wound forward, or rewound, at high speed, and stopped instantly at the beginning or end of the tape or at a particular message.

Conventional tape players have multi-speed tape drives in which the tape is moved forward past a reproducing head at the same fixed speed as was used in the original recording. Standard recording and play speeds are 1⅞, 3¾ and 7½ inchs per second. Speed is determined by a constant speed capstan and pinch roller. The tape may also be moved at fast forward or fast rewind speeds by separating the pinch roller from the capstan and allowing the forward or rewind motor to drive the tape at full speed.

A problem in conventional playback apparatus is the difficulty of stopping a tape when running at fast forward or fast rewind speeds, without overrunning the unwinding reel, looping or snarling the tape. Braking apparatus for stopping the unwinding reel when the winding reel stops commonly employs some mechanical arrangement for applying friction to the unwinding reel or shaft. This is not entirely satisfactory because of difficulties in timing the application and release of the brake and in maintaining the adjustment over long periods of use.

BRIEF SUMMARY OF THE INVENTION

A general object of this invention is to provide a tape scanning apparatus having automatically operable, electrodynamic brake means to prevent looping and overrunning of tape when either motor is stopped while running at full speed in a winding direction.

Another object is to provide a tape scanning apparatus in which an electrical charge is stored in a capacitor, in response to energizing either motor to run in a winding direction, and then discharging the capacitor through the unwinding motor to provide a hold-back drag on the tape automatically in response to deenergizing the winding motor.

Other objects and advantages will be apparent from the following description taken in connection with the drawings in which.

Like parts are referred to by like reference characters throughout the figures of the drawings.

GENERAL DESCRIPTION OF THE PREFERRED EMBODIMENT

Figure 1:
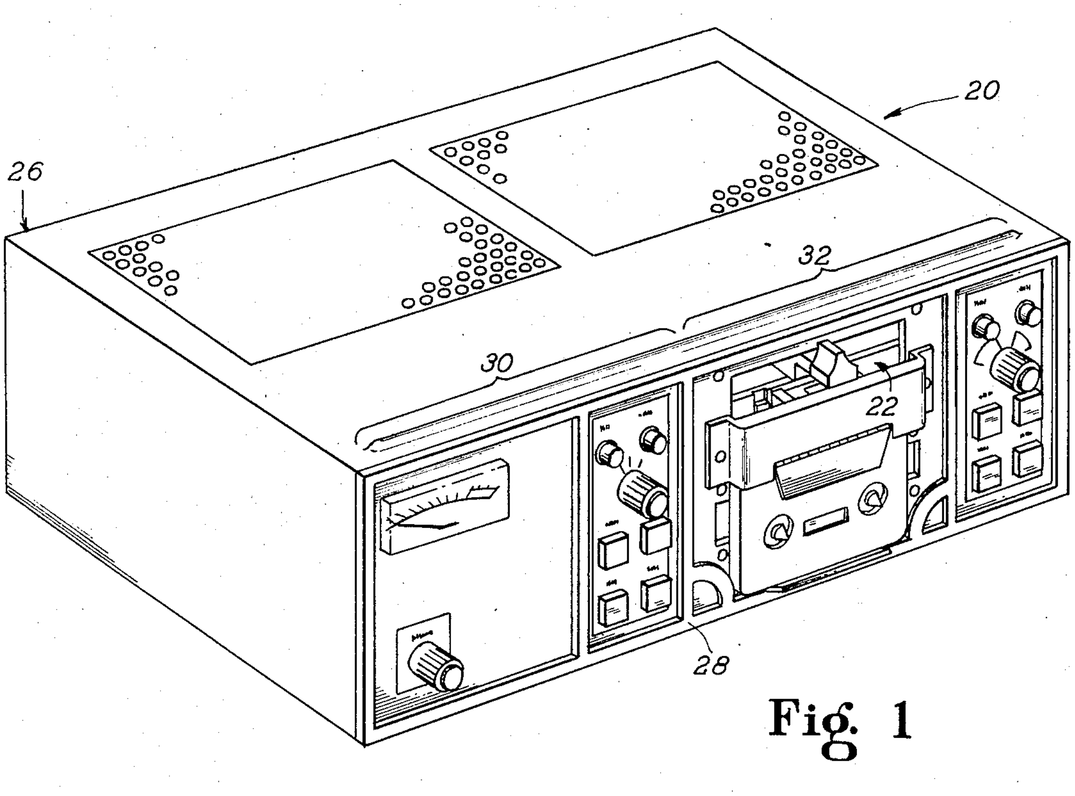
FIG. 1 is a perspective view of a recorder and reproducer employing a tape transport illustrating a preferred form of the present invention.

A recorder and reproducer 20 has a tape transport 22 which incorporates an automatic torque motor brake arrangement illustrating a preferred embodiment of the present invention. It has a housing 26 with a front control panel 28 comprising a recording portion 30 and a reproducing portion 32.

Only the reproducing portion 32 is of special interest in connection with the present invention.

Figure 2:
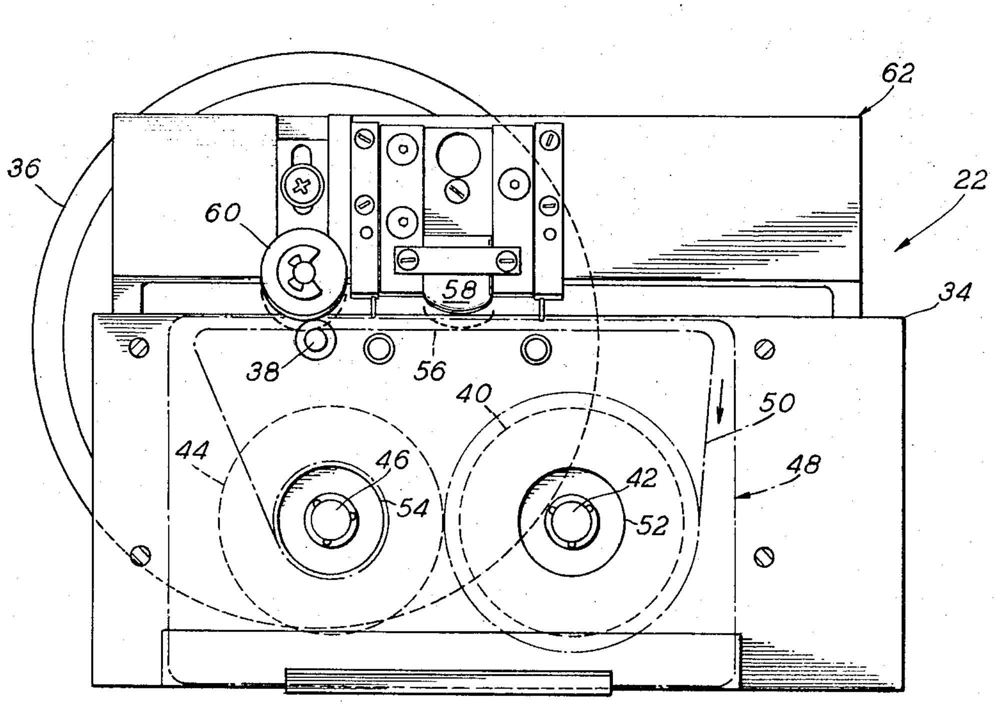
FIG. 2 is a fragmentary front view of FIG. 1 with portions stripped away to expose the tape transport and to show the recording tape with its ends wound upon reels driven respectively by forward and rewind torque motors.

The tape transport 22 includes a main frame 34 with a fixed speed motor 36 driving a capstan 38; a forward or winding torque motor 40 with a spindle 42; and a reverse or rewind torque motor 44 having a spindle 46. A cassette 48 is mounted on the spindles in an upright position as shown in FIG. 2 and has the ends of a recording tape 50 wound respectively on reels 52 and 54 engaging the spindles. The cassette illustrated conforms to the standards of the National Association of Broadcasters, but this invention is not necessarily limited to cassette applications. It may be employed advantageously in other reel-to-reel applications.

The tape 50 is trained with an intermediate run 56 movable past a sound transducing head 58 and pinch roller 60, both carried by a vertically movable auxiliary frame 62. The auxiliary frame is pivoted for up and down movement about horizontal pins (not shown) on the main frame 34 to move the pinch roller 60 toward and away from the capstan 38, and the head 58 toward and away from the tape run 56. The auxiliary frame is biased upwardly by spring means not shown. The arrangement for mounting the motors and for driving the capstan and spindles and for mounting the cassette on the main frame and for mounting the head and pinch roller on the auxiliary frame are described in detail in the above identified patent applications of John P. Jenkins, Ser. Nos. 237,707 and 237,762. Reference may be had to those applications for the various details which are not repeated here, because they form no part of the present invention.

Figure 3:
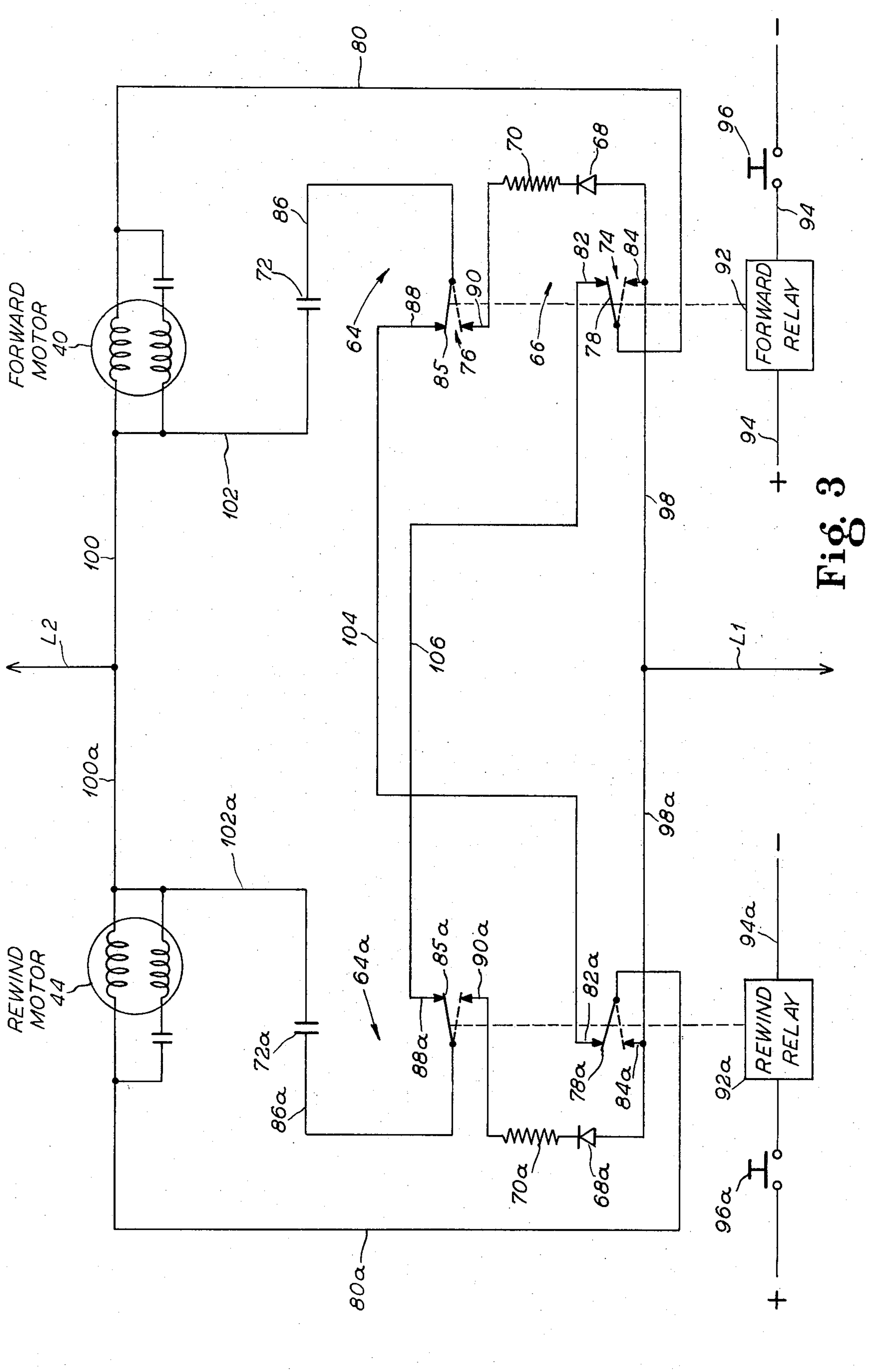
FIG. 3 is a circuit diagram showing the improved electro-dynamic braking system.

The electrical circuit illustrating a preferred form of the electro-dynamic braking means is shown in FIG. 3, details of which will now be described.

Circuit means for selectively energizing the forward motor 40 is generally designated 64. This includes forward relay switch means 66, a rectifier 68 and a resistor 70.

The forward relay switch means 66 includes switches 74 and 76 which are interconnected for simultaneous movement between the solid and broken line positions shown. Switch 74 has a movable contactor 78 connected to one side of forward motor 40 by conductor 80, and is movable between back contact 82 and front contact 84. Switch 76 has a movable contactor 85 connected to one side of a capacitor 72 by conductor 86, and is movable between back contact 88 and front contact 90.

The forward relay switch means 66 includes an actuating coil 92 which is connected to a suitable source of power by conductor 94 controlled by forward switch 96. The closing of switch 96 energizes coil 92 and moves contactors 78 and 85 simultaneously to first operative positions against their respective front contacts, as shown in broken lines. Conversely, the opening of switch 96 deenergizes coil 92 and allows movable contactors 78 and 85 to assume second operative positions against their respective back contacts, as shown in the solid lines.

Front contact 84 and rectifier 68 are connected by a conductor 98 to one side L1 of an alternating current electrical power source. Likewise, the side of motor 40 opposite conductor 80 is connected by a conductor 100 to the other side L2 of the alternating current power source. The side of capacitor 72 opposite conductor 86 is connected to motor 40 and line 100 by a conductor 102.

Similar components and conductors are associated with the rewind motor 44 and are designated by similar reference numerals followed by the letter *a*. For example, the capacitor for the rewind motor is designated **72*a* and the rewind relay is designated 92*a***.

The respective circuit means 64 and **64*a* are cross-connected for mutual interdependence by conductors 104 and 106. Conductor 104 is connected between back contacts 88 and 82*a*. Conductor 106 is connected between back contacts 82 and 88*a***.

The closing of forward switch 96 energizes coil 92 and moves contactors 78 and 85 to their front contacts, as shown in broken lines in FIG. 3. This runs forward motor 40 by connecting it to the alternating current electrical power source L1–L2 via conductors 98, 80 and 100. Storage capacitor 72 is charged by half-wave unidirectional current through a circuit including conductor 98, rectifier 68, resistor 70, and conductors 86, 102 and 100. This drives reel 52 in a winding direction (clockwise in FIG. 2) moving tape in the intermediate run 56 forward across the head 58. The tape will be driven at play speed if the pinch roller 60 presses the tape against capstan 38 as shown in broken lines in FIG. 2, or will be driven at full forward speed if the pinch roller is moved away from the capstan as shown in solid lines in FIG. 2. At either speed, reels 52 and 54 rotate respectively in winding and unwinding directions while capacitor 72 charges and remains charged to provide an electro-dynamic braking effect on motor 44 when motor 40 is subsequently deenergized. Braking will now be described.

When forward relay coil 92 is deenergized, by the opening of switch 96 (or opening a conventional holding circuit, not shown) movable contactors 78 and 85 resume their normal positions against back contacts 82 and 88. At this moment, when reel 52 is decelerating sharply, there is a tendency for reel 54 to continue unwinding. This may cause looping and overrunning of the tape. In the present invention, however, at the instant that movable contactor 85 engages its back contact 88, a circuit is established discharging capacitor 72 through the rewind motor 44 to thereby exert a braking or dragging effect on motor 44 and reel 54. This braking circuit comprises conductor 86, movable contactor 85, back contact 88, conductor 104, back contact **82*a*, movable contactor 78*a*, conductor 80*a*, motor 44, and conductors 100*a*, 100 and 102 back to the capacitor 72**.

Operation of rewind motor 44 and subsequent electrodynamic braking of motor 40 when motor 44 is deenergized proceeds in the same way as follows.

The closing of rewind switch **96*a* energizes coil 92*a* and moves contactors 78*a* and 85*a* to their front contacts, as shown in broken lines in FIG. 3. This runs rewind motor 44 by connecting it to the alternating current electrical power source L1–L2 via conductors 98*a*, 80*a* and 100*a*. Storage capacitor 72*a* is charged by half-wave, unidirectional current through a circuit including conductor 98*a*, rectifier 68*a*, resistor 70*a*, and conductors 86*a*, 102*a*, and 100*a*. This drives reel 54 in a winding direction (counterclockwise in FIG. 2) moving tape in the intermediate run 56 backward, that is, to the left in FIG. 2. During rewind, the pinch roller 60 is usually moved away from the capstan (by means not shown) so the tape will run at full speed. Reels 54 and 52 rotate respectively in winding and unwinding directions while capacitor 72*a* charges and remains charged to provide an electro-dynamic braking effect on motor 40 when rewind motor 44** is deenergized. Braking will now be described.

When rewind relay coil **92*a* is deenergized by the opening of switch 96*a* (or opening a conventional holding circuit not shown) movable contactors 78*a* and 85*a* resume their positions against back contacts 82*a* and 88*a*. At this moment, when the reel 54 is decelerating sharply, there is a tendency for reel 52 to continue unwinding which could cause looping and overrunning of the tape. In the present invention, however, at the instant that movable contactor 85*a* engages its back contact 88*a*, a circuit is established discharging capacitor 72*a* through the forward motor 40 to thereby exert a braking or dragging effect on motor 40 and reel 52. This braking circuit includes conductor 86*a*, movable contactor 85*a*, back contact 88*a*, conductor 106, back contact 82, movable contactor 78, conductor 80, motor 40, and conductors 100, 100*a*, and 102*a* back to the capacitor 72*a***.

While one form in which the present invention may be embodied has been shown and described, it will be understood that various modifications may be made within the spirit and scope of the invention which should be limited only by the appended claims. For instance, while the storage capacitor means for the automatic braking comprises two separate capacitors 72 and **72*a*, a single capacitor suitably switched back and forth between circuit means 64 and 64*a* would function in accordance with this invention. Still further, the rectifiers 68 and 68*a*** may be full-wave or half-wave rectifiers, or a suitable direct current source such as a battery may be used to charge the storage capacitor means. And the electro-dynamic braking, in some circumstances may be used only in the rewind direction while some other form of braking is used in the forward direction.

I claim:

1. In a tape transport having a frame supporting a pair of electric motors connected respectively to drive reels having opposite ends of a recording tape wound thereon, automatic motor brake means comprising:

circuit means for selectively energizing one of said motors to drive the corresponding reel in a winding direction while drawing tape from the other reel and turning said other reel and its motor in an unwinding direction;

capacitor means;

means responsive to energization of said one of said motors to store an electrical charge in said capacitor means; and means responsive to deenergization of said one of said motors to discharge said capacitor means through the other of said motors causing the latter to apply a braking load on the unwinding reel to prevent looping and overrunning of the tape when stopped.

2. In a tape transport, automatic motor brake means according to claim 1 in which one of said circuit means is provided for each of said motors to apply a braking load on the unwinding reel in either forward or reverse directions.

3. In a tape transport, automatic motor brake means according to claim 2 having an alternating current power source, said capacitor means comprising a separate capacitor in each said circuit means, and each said circuit means having a separate rectifier and switch means; each said switch means being actuatable between first and second positions; each of said switch means in said first position connecting the corresponding motor to said alternating current power source for driving the motor in a tape winding direction and connecting the corresponding capacitor to the alternating current power source through the corresponding rectifier for storing a charge in said capacitor; and each of said switch means in said second position disconnecting the corresponding motor from said alternating durrent power source and connecting the charged capacitor to the other motor to exert a braking influence on said other motor by tending to drive said other motor in a tape winding direction.

4. In a tape transport, automatic motor brake means according to claim 2 having an alternating current power source and a direct current power source, said capacitor means comprising a separate capacitor in each said circuit means, and each said circuit means having a separate switch means actuatable between first and second positions; said switch means in said first position connecting the corresponding motor to said alternating current power source for driving the motor in a tape winding direction and connecting the corresponding capacitor to said direct current power source for storing a charge in said capacitor; and said switch means in said second position disconnecting the corresponding motor from said alternating current power source and connecting the charged capacitor to the other motor to exert a braking influence on said other motor by tending to drive said other motor in a tape winding direction.

5. In a tape transport having a frame supporting a pair of electric motors connected respectively to drive reels having opposite ends of a recording tape wound thereon, and a sound transducer head mounted on a movable support for movement toward and away from a run of tape between said reels, automatic braking means comprising:

circuit means for each of said motors for driving the corresponding reel in a winding direction while drawing tape from the other reel and turning said other reel and its motor in an unwinding direction;

each of said circuit means including switch means comprising first and second switches, each of said switches having a pair of movable contactors interconnected for concurrent movement when actuated, each movable contactor in each of said pair of movable contactors being movable between front and back contacts;

the front contact of each first switch being connected to one terminal of an alternating current electrical power source;

the movable contactor of each second switch being connected through a storage capacitor to another terminal of said alternating current electrical power source;

the movable contactor of each first switch being connected to said other terminal of said electrical power source through the corresponding motor;

the back contact of each first switch for each motor being connected to the back contact of the second switch for the other motor; and a rectifier connected between said one terminal of said electrical power source and the front contact of the second switch for each motor.

* * * * *